US009641795B2

(12) United States Patent
Urban et al.

(10) Patent No.: US 9,641,795 B2
(45) Date of Patent: May 2, 2017

(54) METHOD AND APPARATUS FOR REFRAMING AND ENCODING A VIDEO SIGNAL

(75) Inventors: Fabrice Urban, Thorigne Fouillard (FR); Christel Chamaret, Chantepie (FR); Philippe Guillotel, Vern sur Seiche (FR)

(73) Assignee: THOMSON LICENSING DTV, Issy les Moulineaux (FR)

( * ) Notice: Subject to any disclaimer, the term of this patent is extended or adjusted under 35 U.S.C. 154(b) by 162 days.

(21) Appl. No.: 14/233,556

(22) PCT Filed: Jun. 25, 2012

(86) PCT No.: PCT/EP2012/062196
§ 371 (c)(1),
(2), (4) Date: Jan. 17, 2014

(87) PCT Pub. No.: WO2013/010751
PCT Pub. Date: Jan. 24, 2013

(65) Prior Publication Data
US 2014/0153651 A1    Jun. 5, 2014

(30) Foreign Application Priority Data
Jul. 19, 2011    (EP) .................................. 11305937

(51) Int. Cl.
*H04N 7/12*    (2006.01)
*G06F 3/00*    (2006.01)
(Continued)

(52) U.S. Cl.
CPC ............ *H04N 7/01* (2013.01); *H04N 19/115* (2014.11); *H04N 19/14* (2014.11);
(Continued)

(58) Field of Classification Search
CPC ......... H04N 19/0006; H04N 19/00157; H04N 19/002; H04N 7/01
See application file for complete search history.

(56) References Cited

U.S. PATENT DOCUMENTS 8,160,150 B2 *   4/2012   Moore .................. H04N 19/52
                                                           375/240.01
2005/0025387 A1    2/2005    Luo
(Continued)

FOREIGN PATENT DOCUMENTS

CN       101620731       1/2010
EP        1215626        6/2002
(Continued)

OTHER PUBLICATIONS

Chamaret et al. "Attention-based video reframing: Validation using eye-tracking" Pattern Recognition, 2008. ICPR 2008. 19th International Conference on Year: 2008.*
(Continued)

*Primary Examiner* — Dave Czekaj
*Assistant Examiner* — Tsion B Owens
(74) *Attorney, Agent, or Firm* — Tutunjian & Bitetto, P.C.

(57) ABSTRACT

Reframing is used to re-size an image or video content, e.g. for displaying video signals with a given aspect ratio on a display having a different aspect ratio. Window cropping parameters (position and size over time) are constrained in order to optimise the rate/distortion of the encoded output video signal. Initial reframing is improved by computing a saliency map representing a user attention map which considers the video coding context and by providing a macroblock coding efficiency cost map and then taking the saliency map or a combined saliency/coding cost map into account so that the coding cost for said reframed video (Continued)

Figure 1:
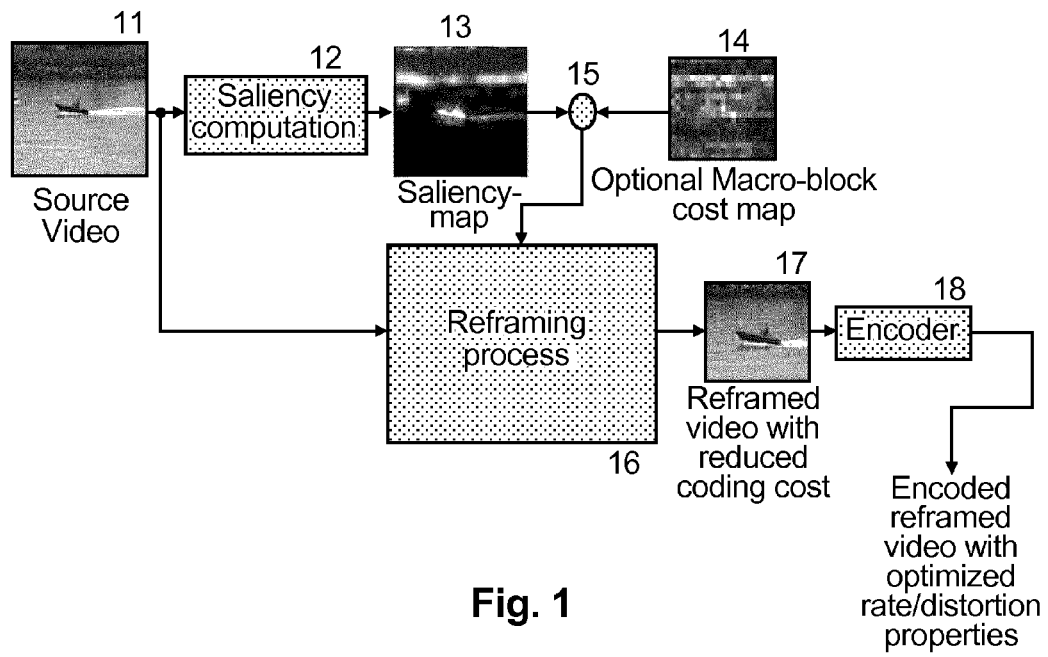

signal is smaller than the coding cost for other candidate reframing windows' sizes and positions.

17 Claims, 3 Drawing Sheets

(51) Int. Cl.

| | | |
|---|---|---|
| *H04N 7/01* | (2006.01) | |
| *H04N 19/176* | (2014.01) | |
| *H04N 19/196* | (2014.01) | |
| *H04N 19/115* | (2014.01) | |
| *H04N 19/14* | (2014.01) | |
| *H04N 19/154* | (2014.01) | |
| *H04N 19/17* | (2014.01) | |
| *H04N 19/85* | (2014.01) | |

(52) U.S. Cl.
CPC ........... *H04N 19/154* (2014.11); *H04N 19/17* (2014.11); *H04N 19/176* (2014.11); *H04N 19/196* (2014.11); *H04N 19/85* (2014.11)

(56) References Cited

U.S. PATENT DOCUMENTS

| | | | |
|---|---|---|---|
| 2007/0230565 A1* | 10/2007 | Tourapis | H04N 19/105 375/240.01 |
| 2008/0212897 A1 | 9/2008 | Le Meur et al. | |
| 2009/0153730 A1 | 6/2009 | Knee et al. | |
| 2011/0200302 A1* | 8/2011 | Hattori | H04N 13/004 386/246 |
| 2013/0050574 A1* | 2/2013 | Lu | G06K 9/4671 348/441 |

FOREIGN PATENT DOCUMENTS

| | | | | |
|---|---|---|---|---|
| EP | 1679659 A1 | 7/2006 | | |
| EP | 1748385 A1 | 1/2007 | | |
| EP | 2071511 A1 | 6/2009 | | |
| EP | 2141658 | 1/2010 | | |
| FR | EP 1679659 A1 * | 7/2006 | ........... | H04N 19/176 |
| FR | EP 1748385 A2 * | 1/2007 | ........... | G06T 3/0012 |
| GB | 2370438 A | 6/2002 | | |
| WO | WO2009024966 | 2/2009 | | |
| WO | WO2009115101 | 9/2009 | | |

OTHER PUBLICATIONS

Deselaers et al., "Pan, Zoom, Scan—Time-Coherent, Trained Automatic Video Cropping", 2008 IEEE Conference on Computer Vision and Pattern Recognition, Anchorage, Alaska, USA, Jun. 23, 2008, pp. 1-8.

Herranz et al., "Adapting Surveillance Video to Small Displays Via Object-Based Cropping", 8th International Workshop in Image Analysis for Multimedia Interactive Services, Santorini, Greece, Jun. 6, 2007, pp. 1-4.

Zhang et al., "Zoomed Object Segmentation From Dynamic Scene Containing a Door", 10th IEEE International Conference on High Performance Computing and Communications, Dalian, China, Sep. 25, 2008, pp. 807-812.

Bongwon Suh etal, Automatic thumbnail cropping and its effectiveness, Proceedings of the 16th Annual ACM SAymposium on user interface software and technology, Vancouver, Canada, Nov. 2-5, 2003; vol. 5, No. 2, Jan. 1, 2003, pp. 95-104.

Chamaret et al., "Attention-based video regraming: validation using eye-tracking", 19th International Conference on Pattern Recognition ICPR™ 08, Dec. 8-11, 2008, Tampa, FL, USA, also describes reframing applications.

Lemeur et al, "Predicting visual fixations on video based on low-level visual features", Vision Research, vol. 47, No. 19, pp. 2483-2498, Sep. 2007.

Chen L-Qun etal, A visual attention model for adapting images on small displays, Multimedia Systems, ACM New York, NY, USA, vol. 9, No. 4, Oct. 1, 2003; pp. 353-364.

Search Report Aug. 2, 2012.

* cited by examiner

METHOD AND APPARATUS FOR REFRAMING AND ENCODING A VIDEO SIGNAL

This application claims the benefit, under 35 U.S.C.§365 of International Application PCT/EP2012/062196, filed Jun. 25, 2012, which was published in accordance with PCT Article 21(2) on Jan. 24, 2013 in English and which claims the benefit of European patent application No. 11305937.2, filed Jul. 19, 2011.

The invention relates to a method and to an apparatus for reframing and encoding an original video signal, wherein the reframing window position and/or size is adapted so as to reduce the encoding cost of the reframed video signal.

BACKGROUND

Reframing is used to re-size an image or video content, e.g. for displaying video signals with a given aspect ratio on a display having a different aspect ratio. For example, High Definition (HD) video content might not be well suited for display on a small portable device.

EP 1748385 A2 discloses dynamic reframing based on a human visual attention model, in which source video content is appropriately cropped in order to keep the region of interest. The output signal may be encoded and transmitted via a network.

C. Chamaret, O. LeMeur, "Attention-based video reframing: validation using eye-tracking", 19th International Conference on Pattern Recognition ICPR'08, 8-11 Dec. 2008, Tampa, Fla., USA, also describes reframing applications.

O. LeMeur, P. LeCallet and D. Barba, "Predicting visual fixations on video based on low-level visual features", Vision Research, vol. 47, no. 19, pp. 2483-2498, September 2007, describes the calculation of a dynamic saliency map, based on a visual attention model.

INVENTION

It appears that no known reframing processing addresses the bit rate and distortion of the output cropped and encoded video signal. For example, a cropping window may track a region of interest, without considering the coding complexity of the encoded video signal. This can result in multiple zooming and de-zooming, pannings and thereby in high coding cost for appearing areas. When the final reframed video signal is encoded, for example by using an H.264/AVC encoder, this can result in an increase of the bit rate and/or a decrease of video quality.

A problem to be solved by the invention is to provide a video source signal reframing wherein the cropping window position and size takes into account the rate/distortion of an encoded output video signal containing that cropped window. This problem is solved by the method disclosed in claim 1. An apparatus that utilises this method is disclosed in claim 2.

According to the invention, the cropping window parameters (position and size over time) are constrained in order to optimise the rate/distortion of the encoded output video signal. An initial reframing is improved by considering the video coding context and then by taking into account the coding efficiency cost induced if the reframed video sequence is encoded.

In principle, the inventive method is suited for reframing an original video signal, followed by an encoding of the reframed video signal, said method including the steps:

computing a saliency map for a current picture of said original video signal, said saliency map representing a user attention map;

providing a macroblock coding efficiency cost map for said current picture of said original video signal, and combining said saliency map and said macroblock coding efficiency cost map;

selecting a candidate reframing window size and position within said current picture of said original video signal;

by using said saliency map or said combined saliency and macroblock coding efficiency cost map, determining in said original video signal a different position and/or size of the reframing window, for which different position and/or size the coding cost for said reframed video signal are smaller than the coding cost for said candidate reframing window size and position;

encoding said corresponding reframed video signal.

In principle the inventive apparatus is suited for reframing an original video signal, followed by an encoding of the reframed video signal, said apparatus including:

means being adapted for computing a saliency map for a current picture of said original video signal, and for providing a macroblock coding efficiency cost map for said current picture and for combining said saliency map and said macroblock coding efficiency cost map, said saliency map representing a user attention map;

means being adapted for selecting a candidate reframing window size and position within said current picture of said original video signal, and for determining in said original video signal a different position and/or size of the reframing window, by using said saliency map or said combined saliency and macroblock coding efficiency cost map, for which different position and/or size the coding cost for said reframed video signal are smaller than the coding cost for said candidate reframing window size and position;

encoding means for said corresponding reframed video signal.

Advantageous additional embodiments of the invention are disclosed in the respective dependent claims.

DRAWINGS

Figure 2:
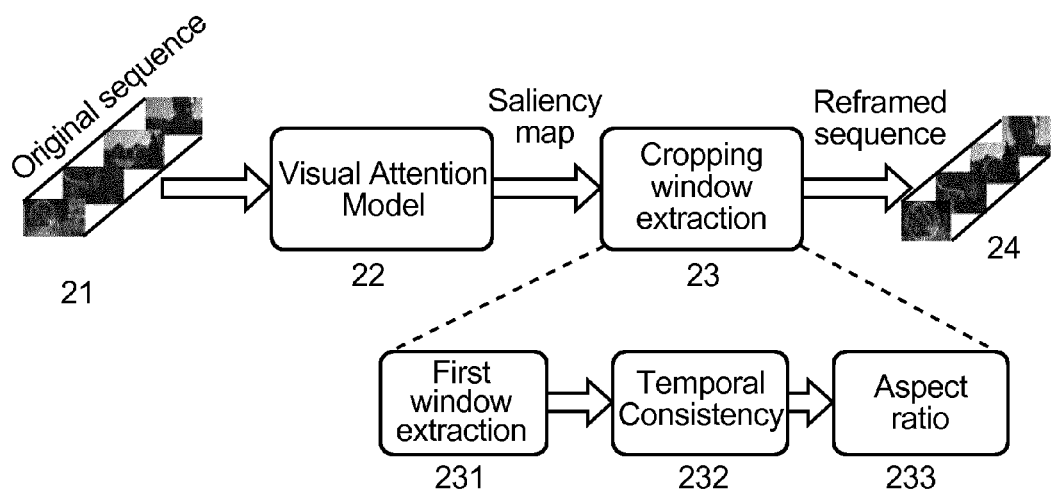
Figure 3:
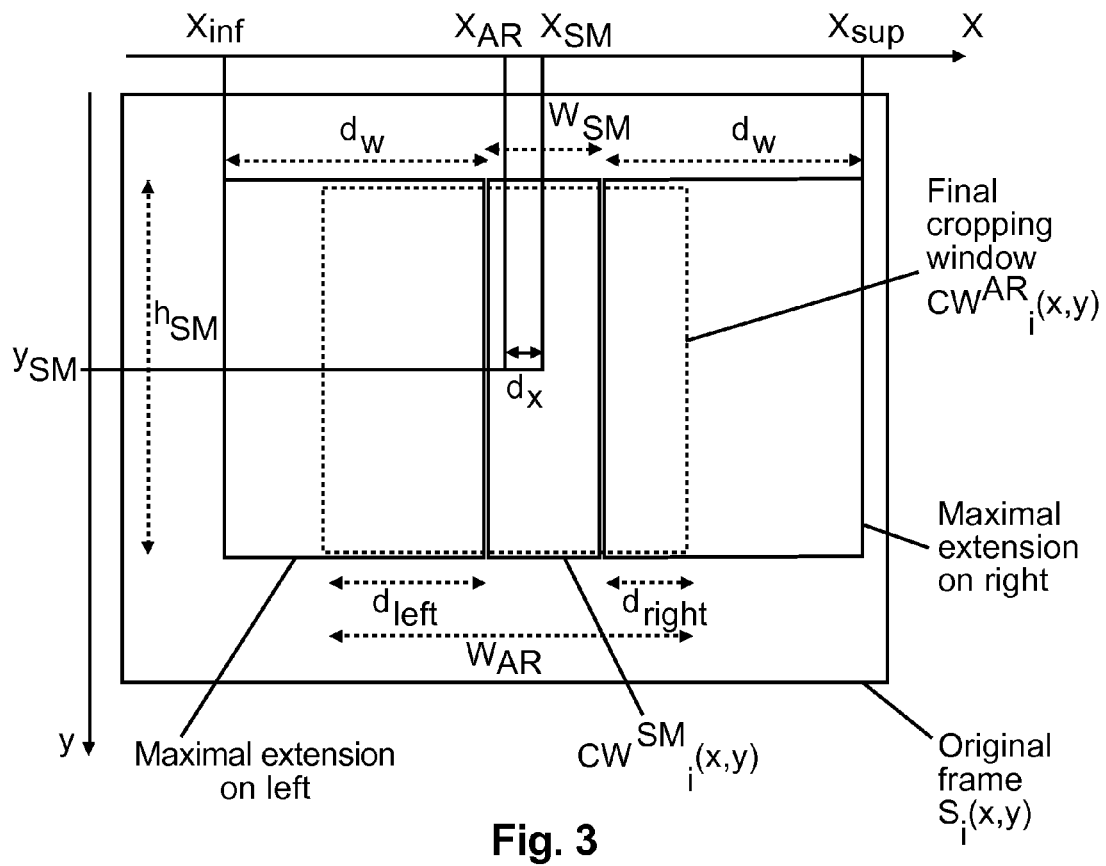
Figure 4:
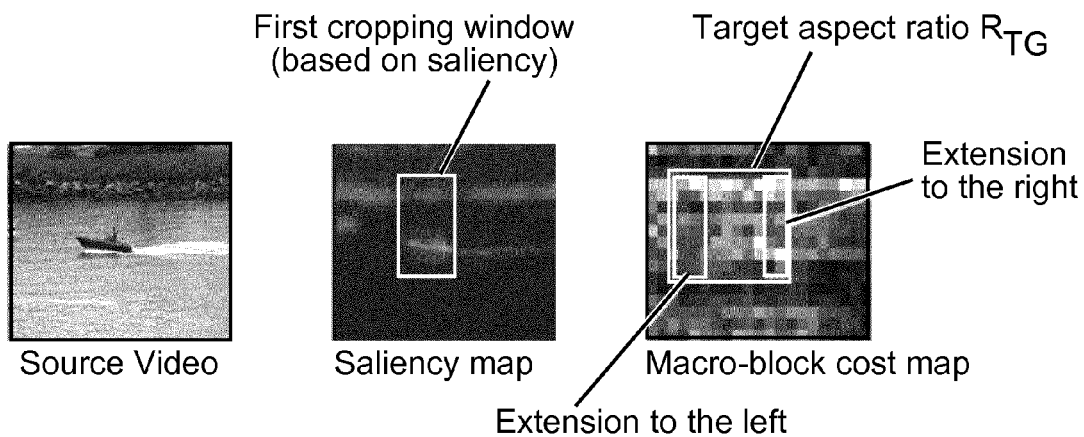
Figure 5:
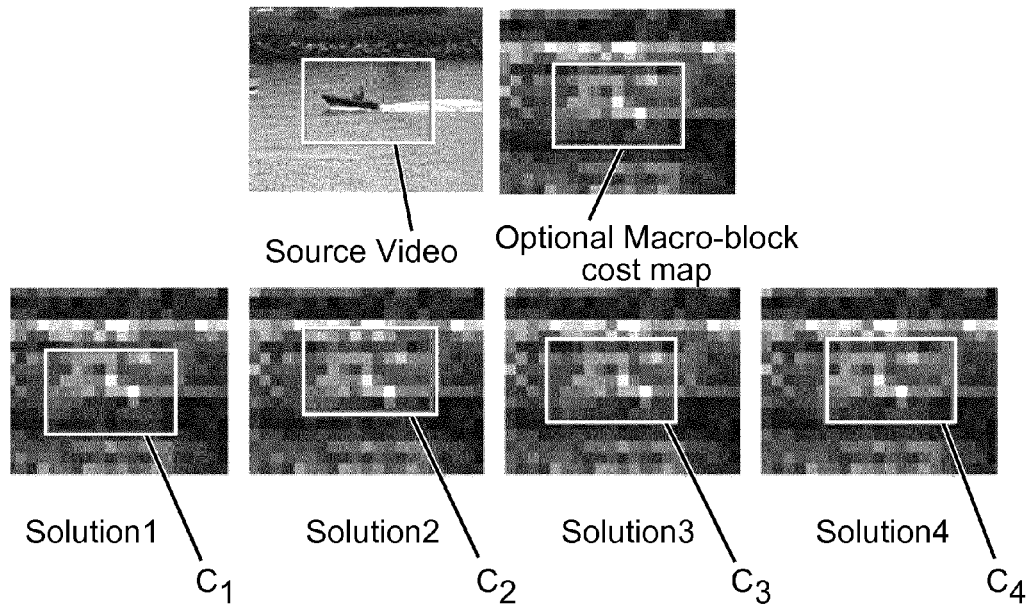
Figure 6:
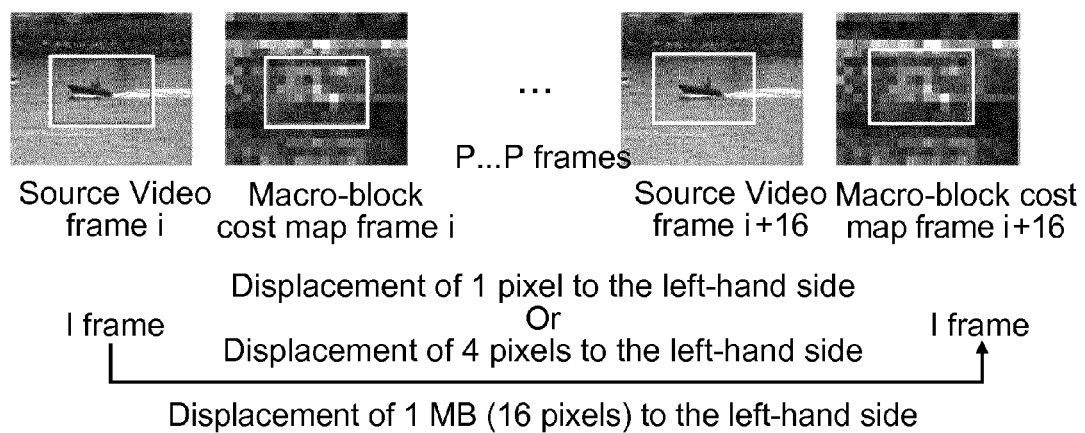

Exemplary embodiments of the invention are described with reference to the accompanying drawings, which show in:

FIG. 1 overall block diagram of the inventive processing;
FIG. 2 reframing processing according to the invention;
FIG. 3 anisotropic extension of a cropping window;
FIG. 4 anisotropic extension based on macro-block cost map;
FIG. 5 choice between several cropping windows regarding their coding costs $C_i$;
FIG. 6 cropping window displacement optimised for video coding.

EXEMPLARY EMBODIMENTS

In FIG. 1 a source video signal is fed to saliency computing step or stage 12 and to a reframing step/stage 16. The saliency computing step or stage 12 computes a saliency map 13 of the current source video signal content, whereby the saliency map represents a user attention map and provides, e.g. per pixel, a saliency value that characterises its perceptual relevancy. The input is the current picture content whereas the output is a map showing which sections of the picture get which attention by humans when looking at that picture, or looking at that picture within a video sequence. A block or macroblock coding efficiency cost map is calculated in a corresponding step/stage 14, which receives its input signal from an encoded version of the source video signal. If step/stage 14 is present, its output signal is combined 15 with the saliency map 13. The result is also input to the reframing step/stage 16, which operates as described in the following, and outputs a reframed video signal 17 with reduced coding cost. The reframed video signal 17 is encoded in an encoder 18 (e.g. by using H.264 processing), resulting in encoded reframed video signal with optimised rate/distortion properties.

To optimise the rate/distortion of the output video signal encoding, the cropping window is following some rules:
- Avoid appearing areas or objects on window borders because this induces intra-coding mode blocks and requires more bits for encoding than inter-coding mode or skip mode. If appropriate, an electronic image stabiliser should be used.
- Avoid changing size of objects: to favour good inter prediction the zoom factor should follow video motion parameters.
- Favour constant dominant motion: encoding can be more efficient if the content motion is constant (good use of bi-directional prediction, skip and direct modes).
- Try to not enclose macro-blocks that are difficult to encode. When reframing compressed video, use the macroblock coding efficiency cost map for trying to reject costly areas of the image if such areas are not of interest.

FIG. 2 shows the reframing processing in more detail. The original source sequence 21 is checked with a visual attention model 22, resulting in a saliency map for a current picture (corresponds to 12 and 13 in FIG. 1). The following cropping window extraction 23 (corresponds to 16 in FIG. 1) outputs a reframed sequence 24, and includes an initial window extraction 231, a temporary consistency check 232 and an aspect ratio processing 233 as described below.

Following are several complementary embodiments that address bit rate reduction of the encoded output reframed video sequence.

A. Improving Temporal Consistency

In this section the fact is used that a temporally more stable image will in principle need fewer bits for encoding.

A.1 Simple Temporal Constraint

A Kalman filter is used to control the position and the size of the cropping window. In a first implementation the covariance noise matrix Q is constrained. The goal of the Kalman filter application is to smooth the variations of the raw values provided by the attention model 22, i.e. the variations of the content of the saliency map over time. In the Kalman modelisation, the raw values given by the attention model 22 are considered as representing a noise measurement while it is tried to estimate the optimal cropping parameters (centre and size of window). The current state $x_k$ of the parameters of the cropping window is defined as $x_k = A_k x_{k-1} + B_k u_k + w_k$, where $A_k$ is the state transition model applied to the previous state, $B_k$ is the control input model, $u_k$ is the control vector, $w_k$ is the state noise with $w_k \approx N(0, Q_k)$, and N is the normal distribution with zero mean and covariance $Q_k$.

At time k an observation or measurement $z_k$ of the true state $x_k$ is made and is defined as $z_k = H_k x_k + v_k$, where $H_k$ is the observation model which maps the true state space into the observed space and $v_k$ is the observation noise with $v_k \approx N(0, R_k)$ that is assumed to be zero mean Gaussian white noise with covariance $R_k$.

In the reframing application, the Kalman filter is used as follows. The state $x_k$ defines the position of the centre of the cropping window and its size. It is defined as:

$$x_k = \begin{bmatrix} centerColumn \\ centerLine \\ windowWidth \\ windowHeight \end{bmatrix}.$$

For each image, the Kalman filter is applied in two steps: prediction phase and update phase.

In the prediction phase, the prediction step estimates the current state with the previous state and the state transition model. In this particular case, the Kalman filter is used to stabilise the cropping window parameters. Consequently the predicted state $\hat{x}_k$ is mostly a copy of the previous state:

$\hat{x}_k = x_{k-1}$, if $A_k$ is the identity matrix and $B_k = 0$, $\hat{P}_k = P_{k-1} + Q_{k-1}$, wherein $P_k$ is the covariance matrix that controls the system noise.

The update phase is a correction of the prediction using the noisy measure:

$\tilde{y}_k = z_k - \hat{x}_k$ is the measurement residual, where $z_k$ are the raw window parameters given by the attention model, and $H_k$ is the identity matrix.

$$x_k = \hat{x}_k + K_k \tilde{y}_k, P_k = (I - K_k) \hat{P}_{k-1},$$

wherein $$K_k = \frac{\hat{P}_k}{\hat{P}_k + R_k}$$

is the matrix gain that minimises the a posteriori error covariance.

As an initial estimate the centre of the screen can be chosen. R and Q are constant diagonal matrices that define state and measure covariance noise, respectively. In this context, the simplest way to implement a temporal constraint is to lower the values in the state covariance noise matrix Q.

This solution does not consider video content with moving background (or non-zero dominant motion). The next section considers this more complex case.

A.2 Dominant Motion Constraint

In case of video content with non-zero dominant motion, i.e. with background translation and/or zoom, to improve coding efficiency, the cropping window follows the dominant motion in order to avoid appearing blocks at the border of the image and to avoid size change of objects for better interpicture prediction.

In the visual attention model, a motion estimator is used that computes parameters of dominant motion with a 6-parameters affine model. In the context previously defined, these parameters are used to derive background translation and zoom.

As before, the Kalman filter state is defined as:

$$x_k = \begin{bmatrix} centerColumn \\ centerLine \\ windowWidth \\ windowHeight \end{bmatrix}.$$

This time the command is non-null and is used to follow dominant motion:

$$u_k = \begin{bmatrix} \text{translation\_x} \\ \text{translation\_y} \\ \text{zoom\_dx} \\ \text{zoom\_dy} \end{bmatrix} \text{ and } B_k = \begin{bmatrix} 1 & & & 0 \\ & 1 & & \\ & & 1 & \\ 0 & & & 1 \end{bmatrix}.$$

Again, for each image the Kalman filter is applied in two steps: prediction phase and update phase.

In the prediction phase, the prediction step estimates the current state with the previous state and the state transition model. The cropping window parameters are allowed to change only according to the dominant motion:

$\hat{x}_k = x_{k-1} + B_k u_k$, where $A_k$ is the identity matrix, $\hat{P}_k = P_{k-1} + Q_{k-1}$, The update phase is a correction of the prediction using a noise measure:

$\tilde{y}_k = z_k - \hat{x}_k$ is the measurement residual, where $z_k$ are the raw window parameters given by the attention model, and $H_k$ is the identity matrix.

$$K_k = \frac{\hat{P}_k}{\hat{P}_k + R_k}$$

is the matrix gain that minimises the a posteriori error covariance.

$x_k = \hat{x}_k + K_k \tilde{y}_k, \; P_k(I-K_k)\hat{P}_{k-1}$

As an initial estimate the centre of the screen can be chosen. Q and R are constant diagonal matrices that define state and measure covariance noise. Here again the state covariance noise matrix Q defines the relation between the model and the actual output. It also takes into account the noise in the estimation of the dominant motion parameters. If Q has low values, the output is strongly constrained to the model, otherwise (Q has high values) it will faster follow the attention model output and possibly high variations due to noise.

The output of the dominant motion $u_k$ can also be integrated into the Kalman filter for improving temporal consistency.

B. Constraining by Macro-Block Cost

It is assumed that the original video sequence 11, 21 comes with values of encoding cost if it is a compressed video sequence. As is well-known, the coding cost of a given macroblock is represented the number of bits required to encode that macroblock using a current quantisation parameter q. According to the invention, these input sequence coding costs are used for constraining the reframing. The processing defined in the following can be used in addition to, or independently from, the processings described in section A.

B.1 Constrained by Overall Image Cost

The state covariance noise matrix Q of the Kalman filter can be derived from the overall cost of the picture sequence. If the cost of the input sequence is low, it can be predicted that the cost of the cropped picture will also be low, and as a consequence the constraints for reducing the cost of the cropped sequence can be lowered.

As an example, the matrix Q can be defined as $Q = I \cdot (\sigma - \lambda \cdot \text{cost})$, where I is the identity matrix, $\sigma$ is a constant, $\lambda$ is a weighting parameter that gives more or less weight to the cost, and cost is the coding cost of the sequence in megabytes per second (MB/s).

B.2 Constraining Window Enlargement with Macro-Block Cost Map

This implementation deals with the aspect ratio step/stage 233 described in FIG. 2. Once the first cropping window has been extrapolated in step/stage 231 out of the saliency map, its location and size is smoothed temporally. Thereafter an anisotropic extension is performed, of which the different variables and notations are depicted in FIG. 3.

The aspect ratio AR is the ratio between the width and the height of the original video signal 11 and 22. The anisotropic extension refines the cropping window size by extending the cropping window $CW_i^{SM}(x_{SM}, y_{SM}, w_{SM}, h_{SM})$ in a direction depending on the current aspect ratio $R_{SM}$, wherein SM refers to salience map. The extension is either on width or on height for achieving the targeted aspect ratio $R_{TG}$.

$$R_{SM} = \frac{w_{SM}}{h_{SM}}$$

is the aspect ratio resulting from the extraction from the saliency map, and $$R_{TG} = \frac{w_{TG}}{h_{TG}} = \frac{w_{AR}}{h_{AR}}$$

is the target aspect ratio.

If $R_{TG} > R_{SM}$, horizontal extension is performed (on the width of the current rectangle) else vertical extension is performed (on the height of the current rectangle).

Assuming a horizontal extension (for vertical extension in parentheses), one can define:

$$h_{AR} = h_{SM}(w_{AR} = w_{SM})$$
$$w_{AR} = w_{SM} + d_w(h_{AR} = h_{SM} + d_h)$$
$$x_{AR} = x_{SM} + d_x(x_{AR} = x_{SM})$$
$$y_{AR} = y_{SM}(y_{AR} = y_{SM} + d_y)$$

where $$d_w = d_{left} + d_{right} = \frac{w_{AR}}{h_{AR}} \times h_{SM} - w_{SM} = R_{TG} \times h_{SM} - w_{SM},$$
$$d_x = x_{SM} + \frac{(d_{right} - d_{left})}{2} \text{ and } w_{AR} = w_{SM} + d_{left} + d_{right}.$$

Once the side of extension is defined, there are still several ways to extend the window. In other words, $d_{right}$ and $d_{left}$ may be computed in a different manner. In the following it is assumed that the width $w_{SM}$ is to be extended to reach the final aspect ratio. The extension may be entirely transferred to the left side, such as $d_{left} = d_w$ and $d_{right} = 0$, to the right side, such as $d_{left} = 0$ and $d_{right} = d_w$, or to both sides in the same proportion, such as $$d_{left} = \frac{d_w}{2} \text{ and } d_{right} = \frac{d_w}{2}.$$

Such solutions are not optimal from a content point of view. Therefore, in the prior art a finer analysis of the saliency map was carried out to favour one side or the other one.

According to the invention a new criterion is used for the choice of the extended direction: the coding cost based on a macro-block coding efficiency cost map for a current picture, which is depicted in FIG. 4. In case the area of one direction costs more bits to be coded (deduced by the macroblock cost map) than the other direction, the other direction is favoured. I.e., the cropping window is extended in the opposite direction proportionally to the bits cost in each direction, whereby this cost is minimised. The extensions to the left and/or to the right are computed as follows:

$d_{right}$ and $d_{left}$ should be found such as $$\frac{d_{right}}{d_{left}} = \frac{C_{right}^{max}}{C_{left}^{max}}. \qquad (1)$$

The bits cost $C_{right}^{max}$ and $C_{left}^{max}$ are computed by considering a full extension to the left ($d_{left}=w_{AR}-w_{SM}$ and $d_{right}=0$) and fully to the right ($d_{right}=w_{AR}-w_{SM}$ and $d_{left}=0$), where $$C_{left}^{max} = \sum_{y=y_{SM}-\frac{h_{SM}}{2}}^{y=y_{SM}+\frac{h_{SM}}{2}} \sum_{x=x_{inf}}^{x=x_{inf}+d_w} C(x,y) \text{ and}$$

$$C_{right}^{max} = \sum_{y=y_{SM}-\frac{h_{SM}}{2}}^{y=y_{SM}+\frac{h_{SM}}{2}} \sum_{x=x_{sup}-d_w}^{x=x_{sup}} C(x,y).$$

$$x_{inf} = x_{SM} - \frac{w_{SM}}{2} - (w_{AR} - w_{SM}) \text{ and}$$

$$x_{sup} = x_{SM} + \frac{w_{SM}}{2} - (w_{AR} - w_{SM})$$

can be defined. Once the saliency quantities available on each side are known, one can estimate the extensions $d_{right}$ and $d_{left}$ on each direction, when using the equation (1):

$$d_{left} = \frac{d_w \times C_{left}^{max}}{C_{left}^{max} + C_{right}^{max}}, d_{right} = \frac{d_w \times C_{right}^{max}}{C_{left}^{max} + C_{right}^{max}}$$

B.3 Predefined Window Location Chosen by Macro-Block Cost Map

Another way to constraint the location of the cropping window box is to compute only the cost corresponding to several reachable cropping windows in the neighbourhood, as depicted in FIG. 5, and to keep the one with the smallest coding cost. The set of M candidate cropping windows has the corresponding cost $\{C_0 \ldots C_M\}$. The coding cost of the final location of the cropping window and thereby the final location itself is determined by $C_{final}=\text{Min}\{C_0 \ldots C_M\}$.

C. Other Features

C.1 Constraint at the Saliency Map Level

Another interesting embodiment is to merge the saliency map with the macro-block cost map, such that an expensive coding cost macro-block decreases its corresponding saliency in the final saliency map. Thereby the potential impact of an expensive macro-block is decreased in the determination of the final cropping window location.

One way to merge the two maps is to apply the following processing, called Coherent Normalisation, Sum plus Product (CNSP):

$$SM_{final}=N_C(SM)+N_C(MB_{inv})+(1+N_C(SM))\cdot(1+N_C(MB_{inv})),$$

where MB is a macro-block coding efficiency cost map value in the range 0 . . . 255, $MB_{inv}=255-MB$, SM is a salience map value, and $N_C$ is the normalisation operator driven by a priori knowledge. Instead of using the global maximum of each map, this operator uses an empirical value.

C.2 Cropping Window Displacement Constraint by Encoder Architecture

Some simplifications can be performed to adapt the cropping window to the encoder architecture, but also to improve coding efficiency in some cases:

Insure alignment of the cropping window on the macro-block grid between prediction frame and current frame. It will improve the temporal prediction quality, but also may help to select the appropriate block size. The drawback is that a smooth temporal variation of the cropping window should be anyway guaranteed; otherwise some temporal artefacts will be visible.

Similarly the cropping window position can be set to match the pixel sampling grid. In that case the motion vector will be necessarily a multiple of a number of pixels, and sub-pel motion estimation may not be necessary. Advantageously, this leads to a significant simplification of the encoder.

Re-use any information from the re-framing process. For instance, in order to compute the saliency areas, it is necessary to compute the motion between frames. This information can be passed to the video encoder to help or replace the encoder motion estimation. Similarly, temporal variations of the cropping window are monitored and managed to ensure a smooth behaviour similar to the camera-man way of shooting. These virtual camera movements can also be used by the encoder to help motion estimation.

If the source input video signal is an encoded one (whatever the encoder format), it is possible to re-use coding information like parameters, like it is known from video signal transcoding or transrating.

In addition to such adaptations of the re-framing process for the encoding, it is also possible to include the reframing process within the encoding loop. For instance, the cropping window can be computed during the encoding of a frame such that the encoding and the re-framing are jointly optimised instead of being performed as a pre-processing. There are several advantages in doing that:

First, the full picture can be encoded and some encoding strategy can be adapted to the cropping window, i.e. H.264/AVC SEI messages are used to signal to the decoder the optional cropping window, higher bit-rate/encoding quality can be set for the cropping window, different slices can be used for the two areas, skip modes can be set for the non cropping window.

Second, the full frame can be used in the encoder but only the cropping window is encoded. This allows the previously described joint optimisations of the cropping window size and position as well as encoding, and the motion estimation can be performed on the full frame to prevent border effects and to ease encoding of the motion field (better homogeneity), provides the possibility of dynamically switching from the cropping window to the full frame.

Third, as mentioned, many computations from one process can be re-used by a subsequent process, instead of performing them twice. The architecture and the CPU performance (or hardware complexity) will be globally reduced, and such system offers more functionalities and flexibility.

The invention claimed is:

1. A method for reframing an original video signal, followed by an encoding of the reframed video signal, the method comprising:
computing a saliency map for a current picture of said original video signal, said saliency map representing a user attention map;
providing a macroblock coding efficiency cost map for said current picture of said original video signal;
selecting a candidate reframing window size and position within said current picture of said original video signal;
using in combination said saliency map and said macroblock coding efficiency cost map for determining in said original video signal a different position and/or size of the reframing window, for which different position and/or size the coding cost for said reframed video signal are smaller than the coding cost for said candidate reframing window size and position;
encoding said corresponding reframed video signal.

2. The method according to claim 1, wherein a Kalman filter is used to control the variation of the position and the size of the reframing window due to variations of the content of the saliency map over time.

3. The method according to claim 2, wherein a Kalman filter is used in two steps for each picture, for predicting a current state $x_k$ with respect to a previous state $x_{k-1}$ and a state transition model so as to stabilize the reframing window parameters, and for correcting the prediction using a noisy measure, wherein state $x_k$ defines the position of the center of the reframing window and its size, $$x_k = \begin{bmatrix} centerColumn \\ centerLine \\ windowWidth \\ windowHeight \end{bmatrix}.$$

4. The method according to claim 1, wherein said macroblock coding efficiency cost map is provided and, if the aspect ratio of the candidate reframing window resulting from the current content of said saliency map is different than the aspect ratio of said original video signal, the candidate reframing window is extended correspondingly in horizontal or vertical direction so as to achieve said aspect ratio of said original video signal, wherein the direction of said extension is performed such that for the current candidate reframing window the macroblock coding cost derived from the current macroblock coding efficiency cost map is reduced.

5. The method according to claim 1, wherein said saliency map is merged with said macro-block cost map, such that an expensive coding cost macro-block decreases the corresponding saliency value in a final saliency map applied.

6. Method The method according to claim 1, wherein said encoding is a H.264/AVC encoding, wherein said encoding means are H.264/AVC encoding means.

7. The method according to claim 6, wherein said re-framing is included within the encoding loop but the full picture is encoded, and wherein SEI messages are used to signal to the decoder a reframing window to be used.

8. The method according to claim 1, wherein said reframing window is aligned to macroblock borders.

9. An apparatus for reframing an original video signal, followed by an encoding of the reframed video signal, said apparatus comprising:
computing means which compute a saliency map for a current picture of said original video signal, and for providing a macroblock coding efficiency cost map for said current picture, said saliency map representing a user attention map;
selecting means which select a candidate reframing window size and position within said current picture of said original video signal, and for determining in said original video signal a different position and/or size of the reframing window, by using in combination said saliency map and said macroblock coding efficiency cost map, for which different position and/or size the coding cost for said reframed video signal are smaller than the coding cost for said candidate reframing window size and position; and
encoding means for said corresponding reframed video signal.

10. The apparatus according to claim 9, wherein a Kalman filter is used to control the variation of the position and the size of the reframing window due to variations of the content of the saliency map over time.

11. The apparatus according to claim 10, wherein a Kalman filter is used in two steps for each picture, for predicting a current state $x_k$ with respect to a previous state $x_{k-1}$ and a state transition model so as to stabilize the reframing window parameters, and for correcting the prediction using a noisy measure, wherein state $x_k$ defines the position of the center of the reframing window and its size, $$x_k = \begin{bmatrix} centerColumn \\ centerLine \\ windowWidth \\ windowHeight \end{bmatrix}.$$

12. The apparatus according to claim 9, wherein said macroblock coding efficiency cost map is provided and, if the aspect ratio of the candidate reframing window resulting from the current content of said saliency map is different than the aspect ratio of said original video signal, the candidate reframing window is extended correspondingly in horizontal or vertical direction so as to achieve said aspect ratio of said original video signal, wherein the direction of said extension is performed such that for the current candidate reframing window the macroblock coding cost derived from the current macroblock coding efficiency cost map is reduced.

13. The apparatus according to claim 9, wherein said saliency map is merged with said macro-block cost map, such that an expensive coding cost macro-block decreases the corresponding saliency value in a final saliency map applied.

14. The apparatus according to claim 9, wherein said encoding means is an H.264/AVC encoder.

15. The apparatus according to claim 14, wherein said re-framing is included within the encoding loop but the full picture is encoded, and wherein SEI messages are used to signal to the decoder a reframing window to be used.

16. The apparatus according to claim 9, wherein said reframing window is aligned to macroblock borders.

17. An encoded digital video signal that was, before the encoding, reframed according to the method of claim 1.

* * * * *